UNITED STATES PATENT OFFICE.

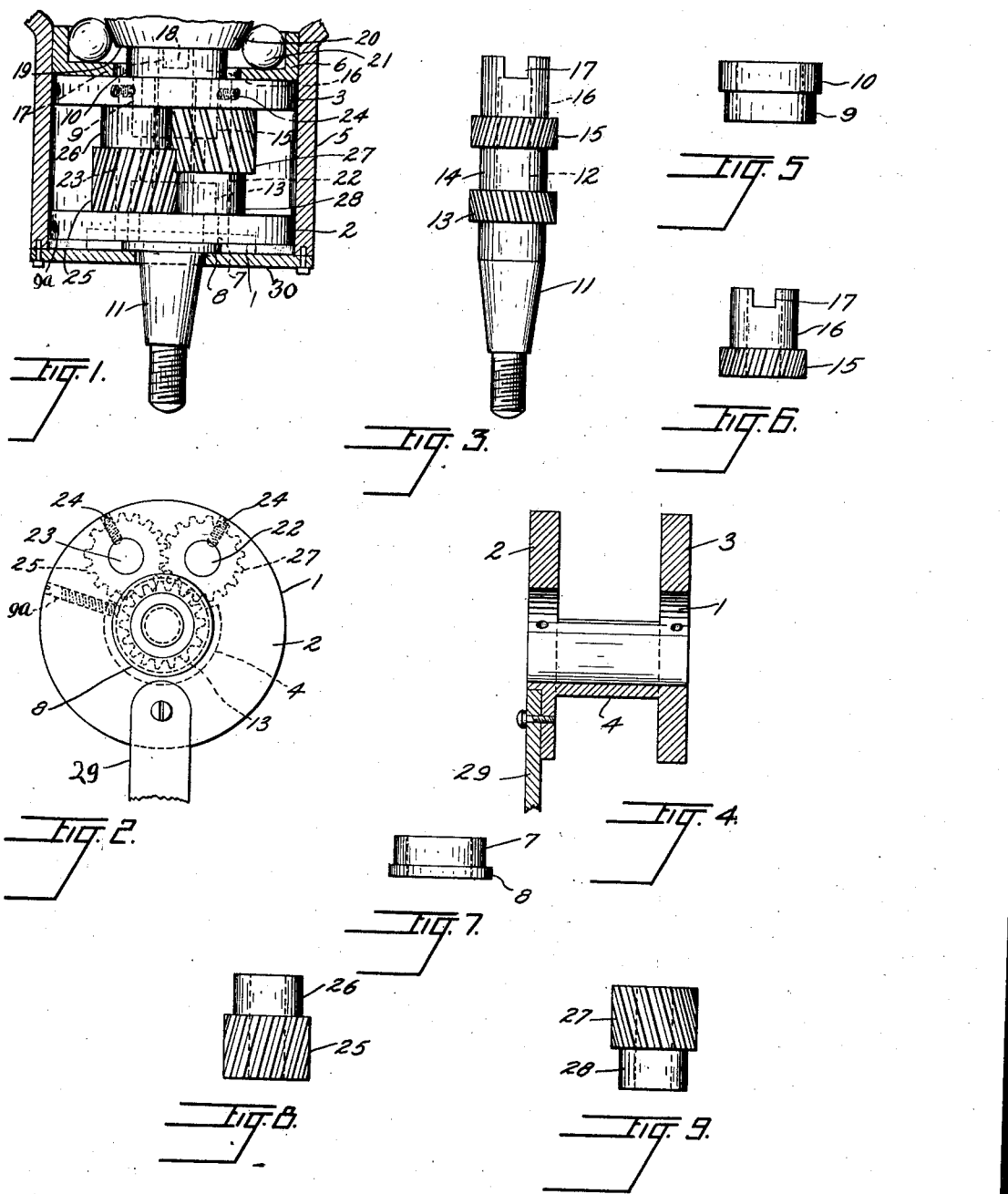

LOUIS J. FLINT, OF SOUTH WHITLEY, INDIANA, ASSIGNOR TO GRIP NUT COMPANY, OF CHICAGO, ILLINOIS, A CORPORATION OF ILLINOIS.

GEARING.

1,093,984.  Specification of Letters Patent.  Patented Apr. 21, 1914.

Application filed October 18, 1911.  Serial No. 655,334.

*To all whom it may concern:*

Be it known that I, LOUIS J. FLINT, a citizen of the United States, and residing at South Whitley, in the county of Whitley and State of Indiana, have invented a new and useful Improvement in Gearing, of which the following is a complete specification.

The main objects of this invention are to provide an improved gearing especially adapted for driving and adjusting magneto armatures; to provide an improved gearing of the planetary type adapted to drive one shaft from another and adapted to vary the angular relation of one shaft with respect to the other independently of the variation caused by the operation of the shafts; to provide an improved gearing of very compact structure adapted to operate with a minimum amount of friction and noise; to provide an improved gearing in which all of the gears are mounted in a rotary element so as to intermesh with each other, and in which part of the gears are adapted to be rotated about the other gears; to provide a differential gearing for magnetos adapted to be disconnected from the armature shaft and removed intact from the casing for the purpose of inspection and repair; and to provide a strong durable and cheap construction adapted to perform its work with great efficiency.

A specific embodiment of the invention is illustrated in the accompanying drawings, in which:

Figure 1 is a side elevation of the gearing embodied in this invention, and shown mounted in a magneto casing, which is in section. Fig. 2 is an end elevation of the gearing removed from the magneto casing. Fig. 3 is a side elevation of the drive shaft, with the drive and driven gears thereon. Fig. 4 is a longitudinal section of the rotatable frame for the gearing. Fig. 5 is a side elevation of the bearing bushing for the driven gear. Fig. 6 is a side elevation of the driven gear. Fig. 7 is a side elevation of the bearing bushing for the drive shaft. Fig. 8 is a side elevation of one of the intermediate or transmission gears. Fig. 9 is a side elevation of the other intermediate or transmission gear.

In the construction shown, the rotary carrying frame or member 1 for the gears and their bearings, comprises two annular end members 2 and 3 which are connected together in axial alinement by the arc shaped sleeve or hub 4. The end members 2 and 3 are of such diameter that they fit closely in the extension 5 of the magneto casing in which they are adapted to rotate, and the inner member 3 abuts against a bearing member 6 carried in said extension.

Rigidly secured in the end member 2 is a bearing bushing 7 having a peripheral flange 8 which abuts against the outer face of said member, and rigidly secured in the end member 3 is a bearing bushing 9 having a flange 10 at its outer end which abuts against the outer face, or that farthest removed from the member 2, of the member 3. Said bushings are held in place by set screws 9ª extending radially through the end members.

The drive shaft 11 is journaled in the bushing 7, and its inner end 12 is reduced in diameter and projects into the bushing 9. Rigidly secured on the reduced portion 12 of the drive shaft is the drive gear 13, which abuts at one face against the inner face of the end member 2 and is provided on its opposite face with a spacing sleeve 14. Loosely mounted on the reduced portion 12 of the shaft 11 is the driven gear 15 which is in axial alinement with the gear 13 and bears at one face against the end of the sleeve 14 and at its other face against the inner face of the end member 3. The driven gear 15 is provided with a sleeve 16 which projects through the bearing bushing 9 and is provided in its outer end with a clutch member 17. The clutch member 17 is adapted to receive the complemental clutch member 18 on the armature shaft 19 to drive said armature shaft. The armature shaft is provided with a bearing surface 20 between which and the bearing member 6 are interposed the bearing balls 21.

Rigidly but removably secured in the end members 2 and 3 are the bearing shafts 22 and 23, which are held in place by set screws 24 in the member 3. The shafts 23 and 24 are parallel with the shaft 11, and may or may not be spaced the same distance therefrom, dependent upon the relative size of gears employed.

Journaled on the shaft 23 adjacent the end member 2 and meshing with the drive gear 13, is the intermediate or transmission gear 25, which is of greater length than the gear 13 and projects beyond the same toward the end member 3. The gear 25 is provided with a bearing or spacing sleeve 26 which abuts against the end member 3 and holds the gear in place. Journaled on the transmission shaft 22, adjacent to the end member 3 and meshing with the transmission gear 25 and the driven gear 15, is the transmission gear 27 having a bearing or spacing sleeve 28 which abuts against the end member 2.

The gears 13, 15, 25 and 27, are herein shown as spiral gears, though it is obvious that straight or spur gears may be employed if desired. It will also be understood that the gears may all be of one size or they may be of different sizes, dependent upon the relative speeds desired for the drive and driven shafts.

The end member 2 is provided with a lever 29 which projects through a slot in the extension 5 and by means of which the frame 1 may be rotated in the extension 5 to adjust the position of the armature with respect to its fields and thereby advance or retard the spark. The outer end of the extension 5 is provided with a removable plate 30, through which the shaft 11 extends, and which when removed permits the gearing as a whole to be withdrawn from the extension.

The operation of the construction shown is as follows: The gearing when assembled forms a unitary structure capable of being as a whole connected to or disconnected from the magneto armature shaft. When the gearing is inserted in the extension 5 of the magneto casing the clutch 17 connects with the clutch member 18 and enables the driven gear 15 to drive the armature shaft. As shown, the gears 13, 15, 25 and 27 cause the armature shaft to rotate in the opposite direction from the drive shaft and at the same speed, though by inserting an odd number of intermediate or transmission gears the armature shaft may be rotated in the same direction as the drive shaft, and by varying the relative sizes of the gears the speed of the armature shaft may be made greater or less than that of the drive shaft. The shaft 11 is connected with the engine to be ignited by the magneto, and to advance or retard the spark relative to the positions of the engine pistons, it is only necessary to rotate the gear frame 1 a partial revolution to cause the armature to approach the fields sooner or later with respect to the movement of the pistons. If the frame is rotated oppositely from the direction of rotation of the drive shaft the armature will approach the fields sooner and advance the spark, and if rotated in the same direction as the drive shaft will be retarded. when the gearing is such that the armature shaft is rotated oppositely from the drive shaft. The rotation of the drive gear, when in operation, acting on the intermediate gears always has a tendency to either advance or retard the spark dependent upon the direction of rotation of the armature with respect to the drive shaft. This tendency is controlled by the lever 29 which may be held in adjusted position in any desired manner.

While but one specific embodiment of the invention has been herein shown and described it will be understood that many details of the construction shown may be varied or omitted without departing from the scope of the claims.

I claim:

1. In a device of the class described in combination, a frame comprising two disklike members having central apertures, and rigidly secured together, a bearing bushing in each of said apertures provided with a flange larger than the aperture, fastening means for said bushings, a driving shaft mounted in one of said bushings, a gear fixed on said shaft normally carried between said members, a second gear loose on said shaft normally carried between said members, said gears being of greater exterior diameter than the interior of said bushings, but of less exterior diameter than the interior of said apertures, whereby said shaft and gears may be removed from said frame by removing said bushings.

2. In a device of the class described in combination, a frame comprising two disklike members having central apertures, and rigidly secured together, a bearing bushing in each of said apertures provided with a flange larger than the aperture, fastening means for said bushings, a driving shaft mounted in one of said bushings, a gear fixed on said shaft normally carried between said members, and a second gear loose on said shaft normally carried between said members, said gears being of greater exterior diameter than the interior of said bushings, but of less exterior diameter than the interior of said apertures, whereby said shaft and gears may be removed from said frame by removing said bushings and gears carried between said members for driving said loose gear from said fixed gear.

3. Gearing, comprising a frame, a drive shaft journaled in and supported by the frame, a drive gear rigidly secured on the drive shaft, a driven gear rotatively mounted on the drive shaft, and intermeshing gears journaled in the frame parallel with the drive shaft and intermeshing with the drive and driven gears.

4. Gearing, comprising an annular frame, a drive shaft journaled axially of the frame and supported thereby, a fixed gear and a loose gear on said shaft, shafts mounted in the frame parallel with the drive shaft, and a train of intermeshing intermediate gears on said shafts meshing at one end with the fixed gear and at the other end with the loose gear.

5. Gearing comprising a drive shaft, a frame in which said shaft is rotatively mounted, a stationary casing in which said frame is rotatably mounted, a fixed drive gear and a loose driven gear on the drive shaft, intermeshing intermediate gears journaled in the frame and meshing with the fixed and loose gears, and means for rotating the frame and causing the intermediate gears to vary the angular rotation of the driven gear with respect to the drive gear independently of the variation caused by the operation of the drive shaft.

6. Gearing, comprising a drive shaft, a rotatable frame surrounding and supporting the shaft, a fixed drive gear on the shaft, a driven gear journaled on the shaft and in the frame, and means journaled in the frame for operatively connecting the drive and driven shafts.

7. Gearing, comprising a frame, a drive shaft journaled in the frame and supported thereby, a drive gear rigidly secured on the shaft, a driven gear journaled on the shaft and having a clutch member thereon extending through the end of the frame and adapted to be connected with an armature shaft, shafts mounted in the frame parallel with the drive shaft, and intermediate gears on said shaft meshing with each other and with the drive and driven gears.

8. Gearing comprising annular end members rigidly connected together, a driven gear journaled in and supported by one of the end members and having a clutch member thereon adapted to engage an armature shaft, a drive shaft journaled in the frame and in said driven gear and supported by said frame, a drive gear rigidly fixed on the drive shaft, shafts mounted in the frame parallel with the drive shaft, and gears on said shafts meshing with each other and with the drive and driven gears.

9. The combination of a cylindrical casing, an armature shaft having a bearing in said casing, a frame comprising two flat ring members supported by and having frictional engagement with the interior of said casing and a sleeve connecting said ring members, a driving shaft journaled in and supported by said frame, a driving gear fixed on said shaft, a driven gear mounted loosely on said shaft and having a sleeve provided with a notch for engaging said armature shaft, and a set of gears mounted on said frame for operatively connecting said driving and driven gears.

10. The combination of a cylindrical casing, a frame supported within and having frictional engagement with said casing, a driving shaft supported by said frame, a driven shaft journaled directly in said casing, gearing supported by said frame for driving one shaft from the other, an armature connected to said driven shaft, and means for exciting said armature.

11. The combination of a casing, a frame supported within said casing, a driving shaft supported by said frame, a driven shaft journaled in said casing independently of said frame, gearing supported by said frame for driving one shaft from the other, and means for turning said frame within said casing.

12. The combination of a normally stationary frame, a driving shaft supported by said frame, a driven gear rotatably supported on said shaft, a driven shaft in alinement with said driving shaft and having loose connection with said driven gear, and means for driving said driven gear from said driving shaft.

13. In a device of the class described in combination, a frame comprising two disk-like members having central apertures and rigidly secured together, a bearing bushing in each of said apertures provided with a flange larger than the aperture, said bushings being arranged with said flanges on the outside of said frame, a driving shaft journaled in one of said bushings, a driving gear fixed on said shaft between said members provided with a collar, a driven gear loose on said shaft abutting against the collar of said driving gear and also provided with a collar which is journaled in the other of said bushings, means for holding said bushings in position, means for driving said driven gear from said driving gear, and means for rocking said frame.

14. In a device of the class described in combination, a frame comprising two disk-like members having central apertures, and rigidly secured together, a bearing bushing in each of said apertures provided with a flange larger than the aperture, fastening means for said bushings, a driving shaft mounted in one of said bushings, a gear fixed on said shaft normally carried between said members, a second gear loose on said shaft normally carried between said members, said gears being of greater exterior diameter than the interior of said bushings, but of less exterior diameter than the interior of said apertures, whereby said shaft and gears may be removed from said frame by removing said bushings, and means for rocking said frame.

15. The combination of a fixed casing, a frame supported within said casing comprising a pair of disk-like members united by a half round connecting member, a driving shaft supported by said frame, a driven shaft journaled in said casing independently of said frame, gearing supported by said frame for driving one shaft from the other, and means for turning said frame within said casing.

16. The combination of a fixed casing, a frame supported within said casing, comprising a pair of disk-like members connected by a half round member, a driving shaft having a driving gear rigidly attached thereto supported by said frame, a bushing intermediate said frame and said driving shaft having an exterior diameter greater than that of said driving gear, a driven shaft journaled in said casing independent of said frame, gearing supported by said frame for driving one shaft from the other, and means for turning said frame within said casing.

17. The combination of a fixed casing, a frame supported within said casing comprising two disk-like members connected by a half round member, a driving shaft having a driving gear rigid therewith mounted central of said frame, a bushing interposed between said frame and said shaft having an exterior diameter greater than that of said gear, a driven gear mounted loosely on said shaft provided with recesses, a driven shaft mounted in said casing independently of said frame having projections engaging the recesses in said driven gear, gearing supported by said frame for driving said driven gear from said driving gear, and means for turning said frame within said casing.

In testimony whereof I have hereunto subscribed my name in the presence of two witnesses.

LOUIS J. FLINT.

Witnesses:
FRANCIS B. MOE,
WILLIAM S. LANCASTER.

Copies of this patent may be obtained for five cents each, by addressing the "Commissioner of Patents, Washington, D. C."